United States Patent
Räsänen et al.

(10) Patent No.: US 10,414,105 B2
(45) Date of Patent: Sep. 17, 2019

(54) METHOD OF USE OF POLYLACTIDE AND MANUFACTURING A HEAT-SEALED PAPER OR BOARD CONTAINER OR PACKAGE

(71) Applicant: Stora Enso OYJ, Helsinki (FI)

(72) Inventors: Jari Räsänen, Imatra (FI); Outi Kylliäinen, Imatra (FI); Kimmo Nevalainen, Kotka (FI); Ville Ribu, Lappeenranta (FI); Ari Rosling, Turku (FI); Mohammad Khajeheian, Turku (FI); Ella Lindström, Turku (FI)

(73) Assignee: Stora Enso OYJ, Helsinki (FI)

( * ) Notice: Subject to any disclaimer, the term of this patent is extended or adjusted under 35 U.S.C. 154(b) by 148 days.

(21) Appl. No.: 15/113,608

(22) PCT Filed: Jan. 22, 2015

(86) PCT No.: PCT/IB2015/050489
§ 371 (c)(1),
(2) Date: Jul. 22, 2016

(87) PCT Pub. No.: WO2015/110981
PCT Pub. Date: Jul. 30, 2015

(65) Prior Publication Data
US 2017/0008227 A1    Jan. 12, 2017

(30) Foreign Application Priority Data
Jan. 24, 2014 (SE) .................. 1400035

(51) Int. Cl.
*B29C 65/00* (2006.01)
*B29C 71/04* (2006.01)
(Continued)

(52) U.S. Cl.
CPC .... *B29C 66/73121* (2013.01); *B29C 35/0805* (2013.01); *B29C 35/0866* (2013.01);
(Continued)

(58) Field of Classification Search
CPC ................................. B29C 66/73121
See application file for complete search history.

(56) References Cited

U.S. PATENT DOCUMENTS

| 2008/0213209 A1 | 9/2008 | Kanazawa et al. |
| 2010/0209636 A1 | 8/2010 | Lai et al. |
| (Continued) | | |

FOREIGN PATENT DOCUMENTS

| KR | 20130096857 A | 9/2013 |
| PL | 399658 A1 | 1/2014 |
| WO | 2013007872 | 1/2013 |

OTHER PUBLICATIONS

Zenkiewicz et al., "Some composting and biodegradation effects of physically or chemically crosslinked poly(lactic) acid", Polymer Testing 31 (2012) 83-92 (Year: 2012).*
(Continued)

*Primary Examiner* — Daniel H Lee
(74) *Attorney, Agent, or Firm* — Greer, Burns & Crain, Ltd.

(57) ABSTRACT

The invention relates to use of polylactide (PLA) as an extruded polymer coating on paper or board intended for the production of containers and packages, which are heated in a stove or microwave oven. According to the invention a polyfunctional cross-linking agent, such as trialkyl isocyanurate (TAIC), is blended with PLA, and the extruded coating layer is subjected to cross-linking electron beam (EB) radiation. PLA may be used as such or blended with another biodegradable polyester such as polybutylene succinate (PBS). EB radiation has been found to improve adhesion of the coating to the paper or board substrate, heat-scalability of the coating, and heat-resistance of the finished containers and packages.

18 Claims, 4 Drawing Sheets

Figure 1:
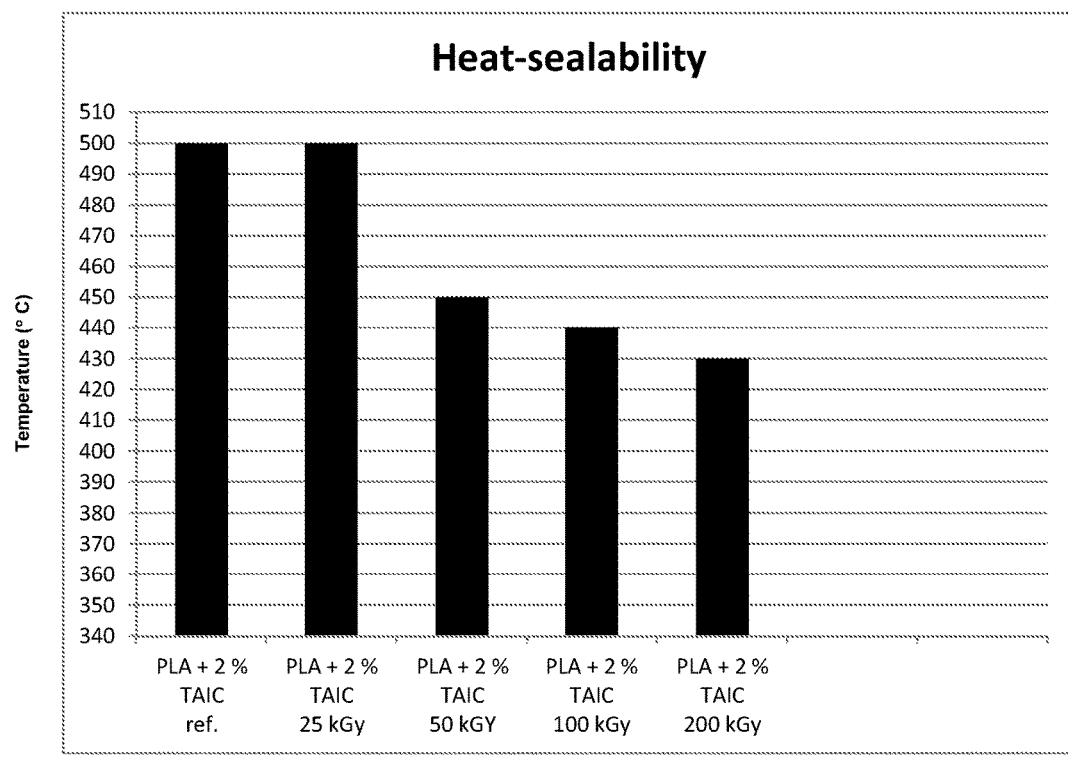

(51) Int. Cl.
  *B32B 27/10* (2006.01)
  *B29C 35/08* (2006.01)
  *B32B 27/20* (2006.01)
  *B32B 27/36* (2006.01)
  *D21H 25/06* (2006.01)
  *D21H 27/10* (2006.01)
  *D21H 19/28* (2006.01)
  *D21H 19/62* (2006.01)
  *B29C 65/02* (2006.01)
  *B29C 35/10* (2006.01)
  *B29K 67/00* (2006.01)
  *B29L 31/00* (2006.01)

(52) U.S. Cl.
  CPC ............ *B29C 65/02* (2013.01); *B29C 66/028* (2013.01); *B29C 66/4322* (2013.01); *B29C 66/71* (2013.01); *B29C 66/72328* (2013.01); *B29C 66/851* (2013.01); *B29C 71/04* (2013.01); *B32B 27/10* (2013.01); *B32B 27/20* (2013.01); *B32B 27/36* (2013.01); *D21H 19/28* (2013.01); *D21H 19/62* (2013.01); *D21H 25/06* (2013.01); *D21H 27/10* (2013.01); *B29C 35/10* (2013.01); *B29C 2035/0827* (2013.01); *B29C 2035/0877* (2013.01); *B29K 2067/00* (2013.01); *B29K 2067/003* (2013.01); *B29K 2067/046* (2013.01); *B29L 2031/7132* (2013.01); *B32B 2270/00* (2013.01); *B32B 2307/31* (2013.01); *B32B 2307/7163* (2013.01); *B32B 2439/70* (2013.01)

(56) References Cited

U.S. PATENT DOCUMENTS

2013/0137562 A1  5/2013  Penttinen et al.
2014/0099502 A1* 4/2014  Nevalainen ............ B32B 27/10
                                          428/349

OTHER PUBLICATIONS

International Searching Authority, International Search Report, PCT/IB2015/050489, dated May 19, 2015.
Wang, Y., et. al. "Rheological and topological characterizations of electron beam irradiation prepared long-chain branched polylactic acid" Fran: Journal of applied polymer science, 2011, vol. 122, Nr. 3, s. 1857-1865.
Shin, B. Y., et. al. "Rheological and Thermal Properties of the PLA Modified by Electron Beam Irradiation in the Presence of Functional Monomer" Fran: Journal of Polymers and the Environment, 2010, vol. 18, Nr. 4, s. 558-566.
Zenkiewicz, M., et. al. "Material behaviour: Some composting and biodegradation effects of physically or chemically crosslinked poly(lactic acid)" Fran: Polymer testing, 2012, vol. 31, Nr. 1, s. 83-92.
Hiroshi Mitomo et al., "Improvement of heat stability of poly(1-lactid acid) by radiation-induced crosslinking," Polymer vol. 46, Apr. 25, 2005, 4695-4703.

* cited by examiner

METHOD OF USE OF POLYLACTIDE AND MANUFACTURING A HEAT-SEALED PAPER OR BOARD CONTAINER OR PACKAGE

This application is a U.S. National Stage under 35 U.S.C. § 371 of International Application No. PCT/IB2015/050489, filed Jan. 22, 2015, which claims priority to Swedish application No. 1400035-0 filed Jan. 24, 2014.

FIELD OF THE INVENTION

The invention concerns use of polylactide for an extruded coating on a fibrous substrate such as paper or board, which may be turned to containers and packages by heat-sealing. A particular goal of the invention is to achieve polylactide-coated heat-sealed packages, which are heatable in a stove or a microwave oven. A tray-formed container may even serve for baking of the food in oven. The invention also covers a method of manufacturing such heat-sealed containers and packages.

BACKGROUND ART

Polylactide (PLA) is a polymer extensively used in packaging technology for its biodegradability. PLA may be used as an extruded coating on a fibrous substrate such as paper or board, which is turned into biodegradable containers and packages. PLA has relatively good water vapour and gas barrier properties, but has the problems of weak processability and heat-resistance, weak adhesion to a fibrous substrate, and a high melting temperature, resulting in poor heat-sealability.

To improve the heat-sealability of PLA US 2002-0065345 A1 describes blending of PLA with a biodegradable aliphatic polyester made from a diol and a dicarboxylic acid, for example polycaprolactone (PLC) or polybutylene succinate adipate (PBSA), the portion of which in the mixture is at least 9%.

According to US 2005-0192410 A1 processability of PLA is improved by blending polycaprolactone and mineral particles into it. US 2007-0259195 A1 further describes PLA-based films and polymer coatings, which are extruded onto a fibrous substrate and wherein polybutylene adipate terephthalate (P BAT) is blended with PLA to improve its heat-resistance.

WO 2011/110750 describes a PLA-based double-layer coating, which is extruded onto a fibrous substrate and in which the outer layer has a larger portion of biodegradable polyester (other than PLA) blended therewith than the inner layer, with an aim to optimize the adhesion between PLA and the fibrous substrate and the heat sealability of PLA.

When the heat-sealability of PLA is improved by another polyester or similar additive blended therewith, there is the disadvantage that these additives are more expensive than PLA. Furthermore, the blending of polymers constitutes an extra working step in the complex process.

A different approach is represented by WO 2011/135182, which teaches ultraviolet (UV) radiation of a PLA layer to improve its heat-sealability. According to tests the heat-sealing temperature is decreased, but any explanation why this is happening is not given.

Polyethylene terephthalate (PET) is a polymer commonly used for ovenable food containers and packages, due to its high heat resistance and thermal stability. PET also has good water and gas barrier properties, which is important for sealed food packages. However, a disadvantage is that PET is difficult to heat-seal. Moreover, conventional PET is non-biodegradable.

To improve the heat-resistance of PLA it is known to subject it to electron beam (EB) radiation, which produces cross-linking while preserving biodegradability of the material. The publications CN 101824211 A, CN 101735409 A and CN 101225221 A may be cited as examples. Cross-linking agents such as triallyl isocyanurate (TAIC) or its derivate may be used as a catalyst. However, the relevant prior art teachings relate to moulded articles or granules, not to coatings on a fibrous substrate, in which adhesivity to the substrate and heat-sealability are required. Cross-linking increases the molecular weight, which is generally regarded as detrimental to heat-sealability.

WO 98/04461 teaches use of EB radiation for improving heat-seals of polyolefins, such as low density polyethylene (LDPE), on a paperboard substrate. EB radiation induces cross-linking of the polymer and thus increases its molecular weight, decreases its melt index, and brings an increase to its melt viscosity. EB is described as improving the strength of heat-sealings, which is the goal of these prior art teachings. However, the increased melt viscosity and thermal stability may still be too low for ovenability, and stove or microwave oven use of such polyolefin coated paper-boards has not been suggested.

SUMMARY OF THE INVENTION

Hence there is still a need for an improved PLA-coated paper or board, which would satisfy the simultaneous requirements of biodegradability, adhesivity of PLA to the paper or board substrate, heat-sealability to allow manufacture of the finished articles, and sufficient heat-resistance to permit heating in a microwave oven or in a stove at temperatures up to about 240° C.

The solution according to the invention, in general terms, is including a cross-linking catalyst as a component blended with PLA, extruding the blend as a coating layer on paper or board, and EB irradiating the coating layer to cross-link the PLA. The coated and EB-irradiated material may then be used for the production of containers or packages, which will be subjected to stove or microwave oven heating.

According to the invention, it has surprisingly been found that EB radiation (beta-rays) that is directed to a coating layer that contains PLA, alone or as blended with other polyesters, together with a cross-linking catalyst considerably improves adhesivity of PLA to the paper or board substrate, improves the heat-sealability of PLA in spite of a measured increase of several orders of magnitude in melt viscosity (shear as well as oscillation) due to cross-linking, and increases heat-resistance and thermal stability of PLA to meet the requirements of oven use.

The invention may be practiced by (i) blending PLA with a cross-linking catalyst, (ii) extruding said blend onto a moving web of fibrous paper or board substrate to form a polymer coating layer, (iii) subjecting the web on-line to cross-linking EB radiation targeted to the coating layer, (iv) turning the EB-irradiated coated material to containers or packages by heat-sealing the coating polymer, and (v) heating such container or package in a stove or a microwave oven. The invention is applicable e.g. to sealed ready-made food packages, which are heated before the food is consumed.

It has been found that beside, or instead of cross-linking EB radiation is able to break polymeric chains in PLA, which is believed to contribute to adhesivity and heat-sealability but which does nothing to improve the heat-resistance. In view of the purposed oven use cross-linking is essential, however. In order to secure ovenability a suitable polyfunctional cross-linking agent, such as TAIC or its derivate, trimethylol propane triacrylate (TMPTA), or the like, is blended with PLA in an amount of 1-5 wt-%, suitably 2-3 wt-%. Unexpectedly, the tests carried out by the inventors have shown that neither adhesion of PLA to the fibrous substrate nor heat-sealability of the PLA layer is weakened thereby.

The above-mentioned findings about the effects of EB treatment are particularly surprising, as according to common wisdom cross-linking and increased melt viscosity should rather spoil adhesivity and heat-sealability. Without limiting the invention it may be assumed, however, that in spite of the presence of the cross-linking agent some chain-breaking occurs during the EB-irradiation, creating an architectural microstructure favouring heat-sealing and adhesion. The resulting broken chain ends would then add to the adhesion as well as to heat-sealability, while simultaneous catalysed cross-linking in the bulk structure works for improved heat-resistance.

By way of improved adhesivity of PLA to the fibrous substrate the weight of the PLA layer may be reduced, which will bring cost savings.

EB radiation has a penetrating and ionizing effect on a polymer coating layer, while it is absorbed and gradually weakened by the polymer. As opposed to UV radiation, which only works by heating the surface of a polymer layer, without penetrating the layer to any greater depth, it is possible by adjusting the operating acceleration voltage to have the effect of EB radiation extended to the entire depth of the PLA layer, while burning or discolouring of the underlying paper or board substrate of fibrous-based packaging materials is avoided. Suitably the acceleration voltage is kept relatively low, in the range of 50 to 300 keV and preferably at 100 keV or less.

Thus, for achieving both improved adhesion and improved heat-resistance by EB irradiation treatment the paper or board substrate may be provided with a monolayer coating only or with multilayer coatings, in which both the uppermost and lowermost coating layer comprise PLA and cross-linking catalyst. Improved heat-sealability of the uppermost layer and improved adhesion to the substrate of the lowermost layer are thereby simultaneously achieved.

The material can be packaging paper, paperboard or cardboard, wherein a single or multilayer polymer coating is brought onto the fibrous substrate by extrusion and EB radiation is targeted to the uppermost coating layer, which contains PLA and the catalyst. A suitable absorbed dose of EB irradiation is in the range of 20 to 200 kGy, preferably in the range of 50-100 kGy.

In testing the invention EB treatment has successfully been carried out in ambient air at room temperature. However, to inhibit degradation and favour cross-linking it may be preferable to carry out the treatment in an inert atmosphere, such as nitrogen, or in vacuum.

As PLA constitutes the coating polymer of the fibre-based packaging material, such as paper or board, it can be extruded directly onto the fibrous base without the need of an intermediate polymeric adhesive layer. PLA can be used as such or as blended with the other biodegradable polyesters, for instance polybutylene succinate (PBS). Fibers or inorganic filler particles may be included in the PLA coating if desired. The invention allows heat-sealing of PLA or other polyester to an uncoated fibrous substrate, which is generally more challenging than usual polymer-to-polymer sealing.

The ovenable containers and packages which, according to the invention, are heat-sealed from the fibre-based PLA-coated packaging material manufactured and EB irradiated as described above, include paperboard cups, such as disposable drinking cups, paperboard or cardboard food trays, and heat-sealed cardboard box and carton packages for oven-heatable food. Board trays with a PLA coating at least on their inside may be formed by deep-drawing, and a lid is heat-sealed to their rim flange to close the package. The drinking cups can be PLA-coated on the inside and uncoated on the outside, whereby in the invention, the vertical seam of the cup is created by sealing the coating of the inner surface to the uncoated paperboard of the outer surface. In box packages, instead, the outer surface of the package can be PLA-coated and the inner surface uncoated, whereby in the sealing, the coating of the outer surface is heat-sealed to the uncoated board surface of the interior of the package. In cups, such as drinking cups, and in box packages, however, the board is often polymer-coated on both sides, whereby, according to the invention, the coating on one or both sides can be EB irradiated and, in the heat-sealing, the coating layers are sealed to each other. Also in this case, the EB radiation according to the invention improves the heat-sealability of PLA.

Cups or packages achieved by means of the invention may also be subjected to the effects of hot steam, to which PLA cross-linked by EB irradiation lends resistance. The cups are useful e.g. in coffee vendor machines, and heat-sealed packages may be treated in an autoclave. Such uses are covered by the invention as claimed.

In the tests related to the invention, it has been observed that electron beam radiation improves the sealability of PLA or a blend containing PLA in heat-sealing that is carried out with hot air. However, use of heat-sealing jaws is expected to be possible also.

According to the invention it is possible to combine EB and UV treatments by subjecting polylactide coating first to UV radiation according to the teachings of WO 2011/135182, incorporated herein by reference, and then to EB radiation as described herein. An opposite order of the steps, i.e. EB irradiation preceding UV, is possible as well.

In practicing the invention it is even possible that the PLA-coated paper or board is first turned into an article such as a container or package, and the coating layer is then subjected to cross-linking electron beam (EB) radiation. In this case EB irradiation enhances the thermal stability of the coating and thus improves sterilizability and ovenability of the finished product package.

EXAMPLES

In the following, the invention is described in more detail by means of application examples and tests conducted.

An example of the preferred implementations of the invention is to extrude, onto paper or board made of kraft, CTMP or mechanical pulps, the weight of which is 40-500 g/m$^2$, a polymer coating that substantially consists of PLA, or of a blend of 40-95 weight-% of PLA and 5-60 weight-% of PBS, and includes 1-5 weight-% of TAIC, and has a weight of 5-20 g/m$^2$. The other side of the paper or cardboard can be left uncoated. The polymer-coated web is conveyed past an EB radiator, with its coated side towards the device, at a velocity of 5-600 m/m in, preferably 200-600 m/min. The EB-irradiated web is cut into blanks, which are heat-sealed into containers, such as paperboard trays, or packages, such as packing boxes or cartons. The sealing can be performed with hot air, whereby the air temperature can be about 420-470° C. For materials that are radiated more intensively, that is, at a slower web velocity, the air temperature required for a complete sealing is lower than for materials that receive less radiation. Instead of hot air, sealing jaws can be used, the temperature of which can be about 145-160° C.; also in this case, the lowest for materials that are radiated the most.

Instead of a moving web, the EB radiation can also be directed to the sealing lines of a web or blank that is stationary with respect to the radiator, which lines thus receive a larger portion of radiation, while the other parts of the polymer surface are not exposed to radiation. Tray blanks consisting of PLA-coated baking cardboard may be cited as an example.

In order to determine the effect of EB irradiation to adhesion of an extruded coating layer to a fibrous substrate a test series was performed with a monolayer of 35 g/m$^2$ of PLA blended with 2 wt-% of TAIC extruded onto one side of a web of paperboard. The extruded coating layer was subjected to varying dosages of EB radiation. Adhesion to the surface of the board web, through ease of peeling off of the coating, was gauged on a scale of 0=no adhesion
1=slight sticking to the web
2=sticking to the web
3=firmly sticking to the web
4=firmly sticking to the web, tearing some fibres
5=firmly sticking to the web, tearing a lot of fibres The EB radiation dosages were 0 (reference), 25 kGy, 50 kGy, 100 kGy and 200 kGy, and the levels of adhesion on the above scale were 3, 4, 5, 5 and 5, respectively. In other words, a dosage of 50 kGy turned out to improve adhesion from adequate to excellent, as the PLA coating layer no longer peeled off from the fibrous surface along the borderline between the board and the coating, but an attempted peeling caused tearing of the structure within the board. This is the standard requirement for perfect adhesion.

As a comparison similar adhesion tests were carried out for 35 g/m$^2$ of PLA on paperboard without added TAIC. The levels of adhesion with EB radiation dosages of 0, 25, 50, 100 and 200 kGy were 2, 3, 3, 5 and 5, respectively. In other words, a dosage of 100 kGy was needed to achieve perfect adhesion.

The same EB irradiated samples of a monolayer of 35 g/m$^2$ of PLA blended with 2 wt-% of TAIC on paperboard were then used for determining the effect of EB to heat-sealability. For each sample the initiation heat-seal temperature was measured, as the temperature of hot sealing air at an electrically heated air nozzle before hitting the surface of the coat layer. At the temperatures indicated the polymer had melted sufficiently for perfect sealing with the uncoated reverse side of the fibrous board. As in case of adhesion, the requirement is that attempted opening of the seal results in tearing within the structure of the board.

FIG. 1 is a diagram showing the heat-seal temperatures (° C.) for the different dosages of EB radiation measured as kGy. It is seen that the EB treatment markedly improves heat-sealability by gradually decreasing the heat-sealing temperature, from initial 500° C. down to 430° C., as the radiation dosage is increased from zero (ref=no treatment) up to 200 kGy.

Figure 2:
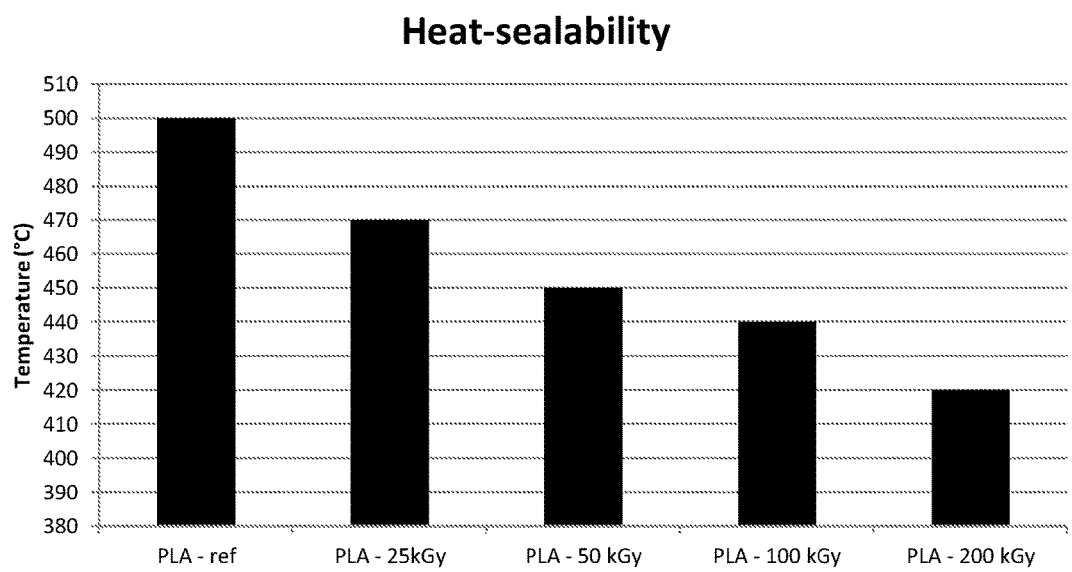

As a comparison, FIG. 2 comprises results from a test series corresponding to that of FIG. 1 but for 35 g/m$^2$ of PLA on paperboard without added TAIC. In this case the gradually increased EB radiation dosage brought the heat-sealing temperature from initial 500° C. down to 420° C.

Figure 3:
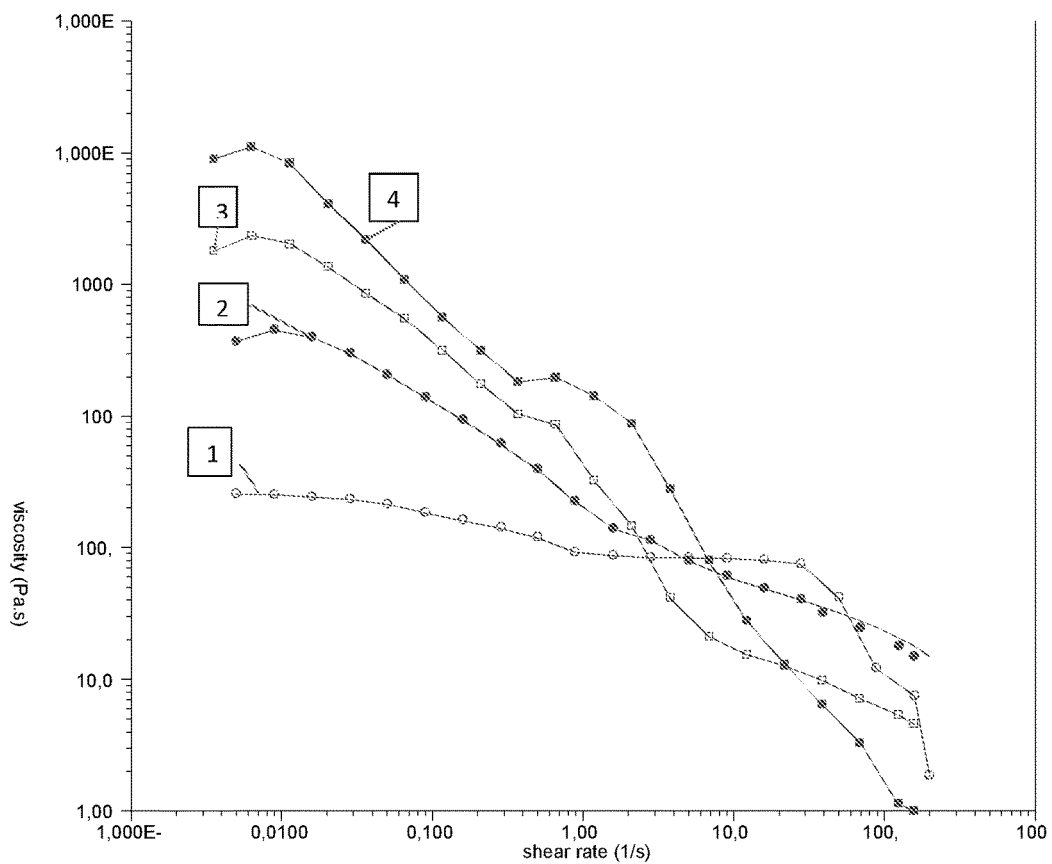

FIG. 3 shows graphs plotting measured shear viscosities to shear rates from extruded polymer films, which have been remelted at 240° C. for the measurements. Graph 1 represents as a reference a film of mere PLA untreated with EB radiation, graphs 2 and 3 represent films of PLA blended with 3 wt-% of TAIC, which have been EB treated before remelting with EB radiation dosages of 100 kGy and 200 kGy, respectively, and graph 4 represents a film of PLA blended with 5 wt-% of TAIC, which has been EB treated before remelting with EB radiation dosage of 200 kGy. The conditions in heat-sealing are estimated to correspond to shear rates of about 5 to 50 1/s. It will be seen that within this range the use of TAIC in PLA and EB irradiation have clearly decreased the shear viscosity of the melt in comparison with the reference, which is an indication of improved heat-sealability, i.e. lower hot air temperatures required for heat-sealing.

Another important finding is that at low shear rates the use of TAIC and EB irradiation have markedly increased the shear viscosity of the melt, which shows that at static conditions the EB treated PLA blends have a superior thermal stability and heat resistance in comparison with untreated PLA. The increased viscosity, i.e. restricted macromolecular long range motion, can be interpreted as resulting from cross-linking between polymer chains, lending improved ovenability to the coated paper or board and to products made thereof. The heat resistance increased by means of cross-linking EB, as such known from the prior art, is thus preserved in spite of the detected improved heat-sealability.

Figure 4:
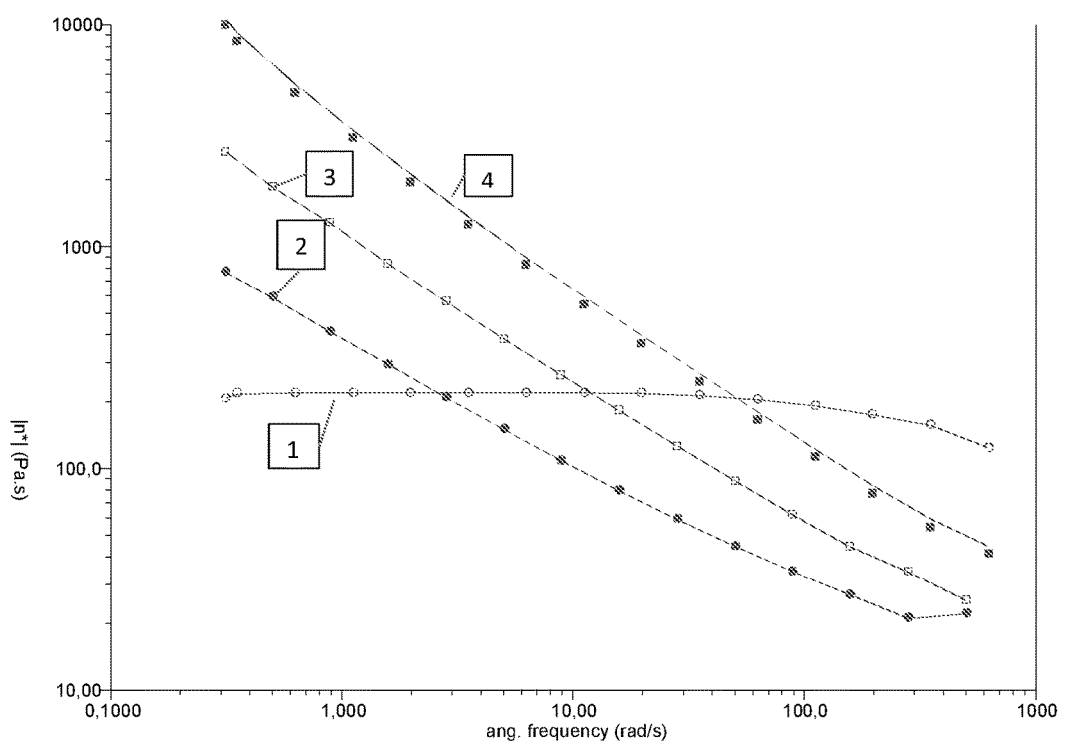

FIG. 4 shows graphs plotting measured oscillation viscosities to angular frequencies for the same melted materials 1 to 4 as in FIG. 3. The results are very much in line with those from shear viscosities, confirming the improved heat-sealability and thermal stability achieved by use of TAIC as a cross-linking agent for PLA in EB irradiation.

PBS was in general found to have higher melt viscosities than PLA, both with EB irradiation treatment and without. It may be concluded that blends of PBS and PLA would yield still better heat resistance than PLA alone, but the heat-sealability could be impaired. Finding an optimal composition for such a blend to meet specific requirements for an ovenable product would be within the skills of an artisan.

The invention claimed is:

1. A method for forming an extruded polymer coating on a fibrous substrate, comprising blending a polyfunctional cross-linking agent with polylactide to form a blend, extruding the blend as a coating layer on the substrate, increasing adhesion of the extruded coating layer to the substrate by subjecting the extruded coating layer to cross-linking electron beam (EB) radiation, and heat-sealing the cross-linked polymer coated substrate to form a container or package, which is configured to be heated in a stove or microwave oven.

2. The method of claim 1, wherein the coating layer is a monolayer coating layer.

3. The method of claim 1, wherein the polyfunctional cross-linking agent is triallyl isocyanurate (TRIC).

4. The method of claim 1, wherein the share of the polyfunctional cross-linking agent in the blend with polylactide is 1 to 5 wt-%.

5. The method of claim 1, wherein the polylactide blended with the cross-linking agent is EB irradiated to improve adhesion to the paper or board substrate.

6. The method of claim 1, wherein the EB radiation is applied in a dosage in the range of 20 to 200 kGy.

7. The method of claim 1, wherein the EB radiation is carried out in an inert atmosphere, or in vacuum.

8. A method according to claim 7, wherein the inert atmosphere is nitrogen.

9. The method of claim 1, wherein another biodegradable polymer is used as a blend with the polylactide in the extruded coating.

10. A method according to claim 9, wherein said another biodegradable polymer is polybutylene succinate (PBS).

11. The method of claim 1, wherein fibers or inorganic filler particles are included in the coating.

12. The method of claim 1, wherein the substrate comprises a coated board that is turned into a disposable drinking cup or food tray.

13. The method of claim 1, wherein the substrate comprises a coated board that is turned into a closed carton package.

14. The method of claim 1, wherein the substrate is a coated board that is turned into a container closed with a heat-sealed lid.

15. A method according to claim 1, wherein the share of the polyfunctional cross-linking agent in the blend with polylactide is 2 to 3 wt-%.

16. A method according to claim 1, wherein EB radiation is applied in a dosage in the range of 50 to 100 kGy.

17. A method of manufacturing a container or package from polylactide-coated paper or board, comprising
 (i) blending polylactide with a polyfunctional cross-linking agent,
 (ii) extruding the blend as a coating layer onto the paper or board,
 (iii) subjecting the coating layer to cross-linking electron beam (EB) radiation, and
 (iv) turning the coated paper or board into the container or package by heat-sealing of the cross-linked coating layer.

18. A method of manufacturing a container or package from polylactide-coated paper or board, comprising
 (i) blending polylactide with a polyfunctional cross-linking agent,
 (ii) extruding the blend as a coating layer onto the paper or board,
 (iii) turning the coated paper or board into the container or package,
 (iv) subjecting the coating layer to cross-linking electron beam (EB) radiation, and
 (v) heat-sealing the cross-linked polymer coated paper or board.

* * * * *